No. 630,031. Patented Aug. 1, 1899.
J. CAMPBELL.
STARTING OR STOPPING MECHANISM.
(Application filed Dec. 4, 1897.)
(No Model.) 2 Sheets—Sheet 1.
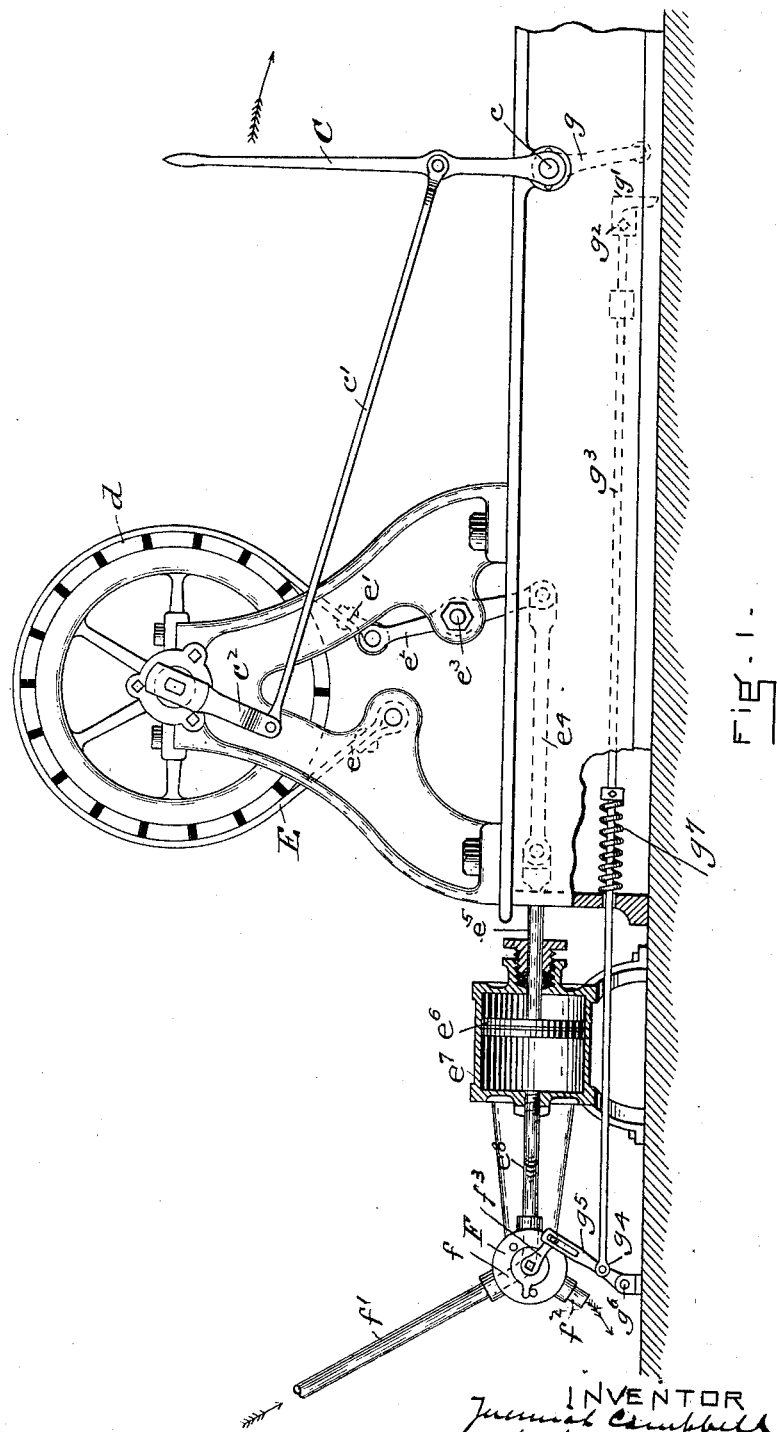
WITNESSES
INVENTOR

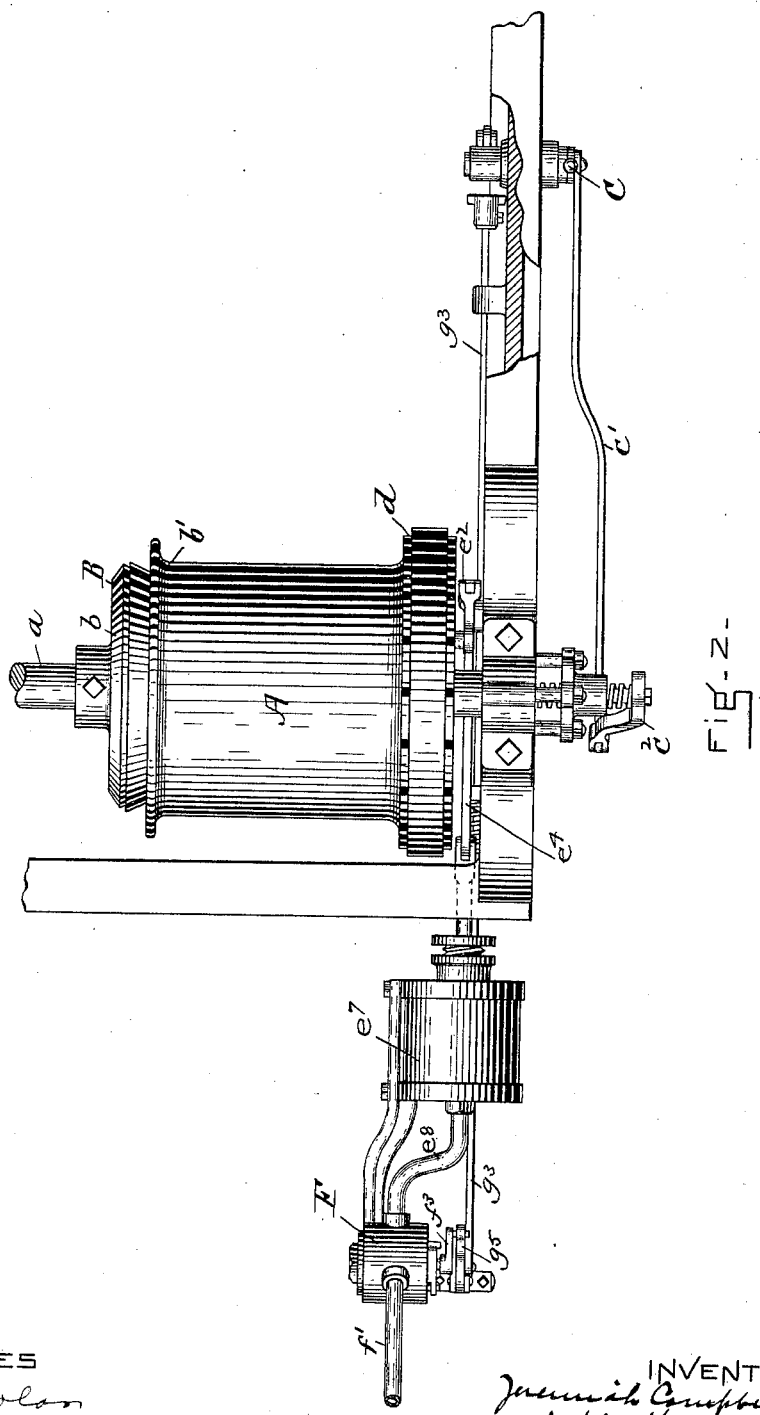

UNITED STATES PATENT OFFICE.

JEREMIAH CAMPBELL, OF CHELSEA, MASSACHUSETTS.

STARTING OR STOPPING MECHANISM.

SPECIFICATION forming part of Letters Patent No. 630,031, dated August 1, 1899.

Application filed December 4, 1897. Serial No. 660,822. (No model.)

*To all whom it may concern:*

Be it known that I, JEREMIAH CAMPBELL, a citizen of the United States, residing at Chelsea, in the county of Suffolk and State of Massachusetts, have invented a new and useful Improvement in Starting or Stopping Mechanism, of which the following is a full, clear, and exact description, reference being had to the accompanying drawings, forming a part of this specification, in explaining its nature.

The invention relates to an improvement in starting and stopping devices. It is especially adapted for use on winding drums or spools of hoisting-engines and is shown in the drawings as applied to a winding-drum of an engine for actuating a steam-shovel. Such drums or spools require at times to be held stationary by a brake or other means and against a strong pull or stress upon the rope which it winds or operates. Heretofore it has been customary to operate the clutch which connects and disconnects such drums or spools from their driving mechanisms by a lever and at the same time to apply a brake to said spool or drum for the purpose of holding it stationary by a second lever. This requires separate hand movements of each lever at a time when it is desirable that the operator should work quickly and aside from the loss of time thus occasioned often does not give satisfactory results, as the brake cannot easily be applied by hand to the spool or drum with sufficient force to immediately stop it and hold it stationary against the stress or pull of the spool or drum rope.

In the drawings, Figure 1 is a view principally in side elevation of my improvement as applied to the winding spool or drum of a hoisting-engine. Fig. 2 is a view principally in plan thereof.

A represents the usual form of the hoisting drum or spool of the ordinary hoisting-machine on the market. It is mounted upon a shaft $a$ and is adapted to be connected and disconnected with the shaft by a friction-clutch B, one member $b$ of which is fixed to the shaft $a$ and the other member is in the end $b'$ of the spool or drum and is fast to the spool or drum. Engagement of the two members of the clutch is effected by means of the hand-lever C pivoted at $c$, the long connecting rod or link $c'$ connecting the lever C with the outer end of the short lever $c^2$, which operates the member $b'$ of the clutch.

The drum or spool has a narrow cylindrical braking-section $d$ at one end thereof, and about this braking-section there is extended a band-brake E, the end $e$ of which is fast to the frame and the end $e'$ of which is attached to one end of a lever $e^2$, pivoted at $e^3$. This lever is connected by a pitman $e^4$ with the outer end $e^5$ of a piston $e^6$, contained in a cylinder $e^7$. The cylinder is supplied with steam through the supply-pipe $e^8$, which pipe also acts as an exhaust-pipe through which the steam may escape from the cylinder. At the end of the pipe is a three-way cock or valve F, which is adapted to be turned to bring its passage $f$ into line with the steam-supply pipe $f'$ and the pipe $e^8$ when it is desired to supply the piston with steam and into line with the pipe $e^8$ and the escape-pipe $f^2$ when it is desired to permit the exhaust-steam to escape from the cylinder.

The valve is operated by the clutch-lever C, the said lever having a downward extension $g$, which is adapted at any desired interval in its movement to come into contact with the face $g'$ of a head $g^2$, secured to the end of a connecting-rod $g^3$. The other end of this rod is connected at $g^4$ to a lever $g^5$, pivoted at $g^6$, and this lever is at its upper end connected with the outer end of the valve-lever $f^3$, the connection being by means of a slot and pin. The movement of the rod $g^3$ in one direction will cause the valve or cock to be turned to open the steam-inlet to the cylinder, and its movement in the reverse direction will cause the valve or cock to be moved to open the exhaust. The rod is preferably moved in one direction by the clutch-lever C and in the reverse direction by the spring $g^7$, which is compressed by the clutch-lever upon its movement of the rod and which when released by the return movement of the clutch-lever moves the rod in a reverse direction.

The operation of the device is as follows: The clutch-lever C being moved in the direction of the arrow by the operator first engages the driving-clutch with the drum or spool and then operates the valve F to open the exhaust, whereby the steam or air in the brake-cylinder is permitted to escape from the cylinder, and thus release the piston and the brake, the piston then moving backward in the cylinder. A reverse movement of the clutch-lever C will first cause or permit the valve to be turned to close the exhaust and open the steam or air inlet to the cylinder, whereby the brake is immediately set by the forward movement of the piston in the cylinder, due to the pressure which is thus admitted to it, and the further movement of the clutch-lever in the same direction disengages the driving-clutch from the drum or spool while the brake remains set, as the steam or air inlet to the piston remains open.

While I have shown the brake as a band-brake and prefer as a rule to so use it, I do not confine the invention to this type of brake.

While I prefer to use steam for actuating the piston, any other expansible medium or a fluid medium may be used.

The organization of the invention is such that, unlike the usual starting and stopping devices, the brake is caused to be automatically set before the release of the clutch and the brake is not automatically released until after the members of the clutch have become engaged. This always insures the holding of the drum by the brake, which is set before the drum is disengaged from the clutch and remains set until after the clutch has engaged it and prevents the liability of accident arising from the setting of the brake the instant the clutch is released or immediately after its release or from a release of the brake immediately before the setting of the clutch. It will also be understood that when the machine is at rest the operating-lever C is in the position represented in Fig. 1—that is, the clutch is disengaged from the winding-drum and the brake is set upon the winding-drum. Upon the movement of the lever C in the direction of the arrow the clutch is engaged with the winding-drum and the winding-drum started, and instantly following the engagement of the clutch with the winding-drum the continued movement of the lever C in the same direction actuates the valve of the brake-cylinder to open the exhaust, permitting the escape of medium—steam or pressure—from the cylinder and the release of the brake. It will further be understood that while the parts of the machine are in this position in relation to each other the lever C is held by the operator and that the release of the lever by the operator will immediately cause the brake to be set upon the drum slightly in advance of the disengagement of the clutch from the drum. The return movement of the lever to the position represented in Fig. 1 first closes the exhaust and opens the steam or pressure inlet to the brake-cylinder, thereby forcing the piston forward and setting the brake upon the drum, while the further movement of the lever after the setting of the brake effects a disengagement of the driving-clutch from the drum, and while the lever C is in the position represented in Fig. 1 the brake is held set upon the drum by the continued pressure of the steam or air in the brake-cylinder, which is then fully connected with the steam or pressure supply. The brake is thus operated automatically, first, to be released slightly before the disengagement of the clutch from the drum; second, to be set slightly before the disengagement of the clutch from the drum, and, third, to be automatically held set while the drum is stationary.

Having thus fully described my invention, I claim and desire to secure by Letters Patent of the United States—

1. The improvement in the starting and stopping mechanism of hoisting-engines herein described, the same comprising a driving member of a clutch, a driven member of a clutch, a winding drum or spool fast to the driven member and an operating-lever connected with one of the clutch members to effect an engagement of the members upon its movement in one direction and a disengagement of the members upon its movement in a reverse direction, a braking-section upon or connected with said drum or spool, a brake to act upon said braking-section of the drum or spool, automatic means for operating said brake comprising a cylinder, a piston contained therein connected with said brake and adapted to be actuated by a pressure medium within the cylinder, a valve for controlling the inflow to and outflow of said medium from the cylinder and devices connecting said valve with the said actuating-lever, whereby the movement of the lever causes the valve to be moved to open the exhaust after the engagement of the clutch members, thus holding the brake until said engagement and releasing it after said engagement, and whereby also the movement of the actuating-lever in a reverse direction permits the brake to be automatically set in advance of the disengagement of the clutch members and to thereafter be automatically held set, as and for the purposes set forth.

2. The combination in a hoisting-engine of a winding spool or drum, a member of a clutch thereon, a driving member of a clutch, a clutch-lever movable in one direction to effect an engagement of the members of the clutch and in a reverse direction to disengage them, a spool or drum brake, independent means for releasing and setting the brake and holding it set, the time of action of which is controlled by the said lever, and connecting devices between the said lever and brake-operating means, the said lever and connecting devices being adjusted to cause the said brake to be operated to bear upon the winding drum or spool a short interval after it has been engaged by the driven member of the clutch, and to be then released and to be reset slightly before the disengagement of the clutch and for holding it set during said disengagement.

3. The combination in a hoisting-engine of a drum or spool, its driving-clutch, a lever connected with the driving-clutch to move it in one direction to engage the drum or spool and to move it in the reverse direction to disengage it from the drum or spool, the drum or spool brake, a brake-cylinder, a power-actuated piston contained in said cylinder, connected with the brake, means such as a valve for admitting pressure to one end only of said cylinder and for permitting the escape of said pressure from said cylinder, and devices connecting said means with the clutch-lever, as and for the purposes set forth.

JEREMIAH CAMPBELL.

Witnesses:
F. F. RAYMOND, 2d,
J. M. DOLAN.